(12) United States Patent
Dabrowski

(10) Patent No.: US 10,642,915 B2
(45) Date of Patent: May 5, 2020

(54) SYSTEM AND METHOD FOR AUTOMATIC ADVANCEMENT OF NAVIGATION THROUGH A USER INTERFACE

(71) Applicant: ADVANCED DIGITAL BROADCAST S.A., Eysins (CH)

(72) Inventor: Bartosz Dabrowski, Zielona Gora (PL)

(73) Assignee: ADVANCED DIGITAL BROADCAST S.A., Eysins (CH)

( * ) Notice: Subject to any disclaimer, the term of this patent is extended or adjusted under 35 U.S.C. 154(b) by 209 days.

(21) Appl. No.: 15/793,994

(22) Filed: Oct. 26, 2017

(65) Prior Publication Data

US 2018/0113948 A1 Apr. 26, 2018

(30) Foreign Application Priority Data

Oct. 26, 2016 (EP) ..................................... 16195691

(51) Int. Cl.
| | | |
|---|---|---|
| G06F 16/954 | (2019.01) | |
| G06F 3/048 | (2013.01) | |
| G06F 9/451 | (2018.01) | |
| G06F 3/0485 | (2013.01) | |
| H04L 12/24 | (2006.01) | |
| H04W 56/00 | (2009.01) | |

(52) U.S. Cl.
CPC ............ G06F 16/954 (2019.01); G06F 3/048 (2013.01); G06F 3/0485 (2013.01); G06F 9/451 (2018.02); H04L 41/22 (2013.01); H04W 56/0045 (2013.01)

(58) Field of Classification Search
CPC ...... G06F 16/954; G06F 9/451; G06F 3/0485; G06F 3/048; H04W 56/0045; H04L 41/22
See application file for complete search history.

(56) References Cited

U.S. PATENT DOCUMENTS

| | | | | |
|---|---|---|---|---|
| 8,307,005 | B1* | 11/2012 | He ......................... | G06F 16/951 707/791 |
| 8,490,021 | B2* | 7/2013 | Emard ................... | G06F 16/904 715/853 |
| 2008/0109785 | A1* | 5/2008 | Bailey ...................... | G06F 8/34 717/109 |
| 2012/0005192 | A1* | 1/2012 | Bao ...................... | G06F 16/9558 707/721 |
| 2013/0238783 | A1* | 9/2013 | Alexander ............ | G06F 16/954 709/224 |

(Continued)

Primary Examiner — Jeanette J Parker
(74) Attorney, Agent, or Firm — Mark M. Friedman

(57) ABSTRACT

A method for automatic advancement of navigation through GUI, involving: (a) providing a graph representing GUI, comprising at least two states and at least one path allowing navigation from one of said states to a different one of said states; (b) clearing a current path; (c) receiving a request to navigate to a state of said states and outputting a suitable response; (d) adding the current state to the current path; (e) starting a timer; (f) receiving a request to navigate to another state of said states and outputting a suitable response; (g) stopping said timer and comparing its result with a threshold value wherein if said result is lower than said threshold, adding information on said another state to the current path; (h) storing the current path in a paths database; and (i) repeating steps (e)-(h) until said result is greater than said threshold.

6 Claims, 4 Drawing Sheets

(56) References Cited

U.S. PATENT DOCUMENTS

| | | | |
|---|---|---|---|
| 2014/0189587 A1* | 7/2014 | Nam | H04N 21/44222 |
| | | | 715/810 |
| 2015/0089424 A1* | 3/2015 | Duffield | G06Q 10/00 |
| | | | 715/771 |
| 2018/0088970 A1* | 3/2018 | Mitchell | G06F 17/2247 |
| 2019/0196932 A1* | 6/2019 | Adika | G06N 20/10 |

* cited by examiner

SYSTEM AND METHOD FOR AUTOMATIC ADVANCEMENT OF NAVIGATION THROUGH A USER INTERFACE

TECHNICAL FIELD

The present invention relates to a system and method for automatic advancement of navigation through a user interface. In particular the present invention relates to detecting, which paths of a Graphical User Interface states are traversed, by a user most frequently and offer short-cuts to the most commonly selected locations depending on the present context e.g. present location.

BACKGROUND OF THE INVENTION

A wide selection of user interfaces and applications utilizing such is available. One form of a user interface is a graphical user interface (GUI) providing the user with graphical representation of the application and/or its data.

In general GUI can be viewed as a state of a display screen on which it is presented. It is to be noted that 'state' does not necessarily mean exact location and look of the displayed graphical elements. State may refer to the set of elements displayed on screen or the mere fact of a particular view or form or page or the like being displayed. Thus GUI can e.g. under the influence of the user change its state. One example of change of state is moving to a different page. Another example of change of state is displaying a more detailed view of a particular object.

Prior art solutions offer simple short-cuts to one change of state only e.g. the most often used documents in MS Windows operating system's START menu provides a list of most commonly opened documents. This provides just one step of GUI state change i.e. from the desktop or START menu view to the document browser or editor view. There is no mechanism that would detect what the most common next action done by the user is. An exemplary embodiment of such action would be to immediately run word count statistic generator on the document and consequently a spell-check.

Other solutions available include a possibility to either manually or semi-automatically define macro commands that group different commands into one sequence. Such solution is called a 'macro' hereinafter. However, such solution has two drawback that the present invention attempts at eliminating. The first disadvantage of macros is the necessity to explicitly enter a definition state to allow adding of steps to the sequence. The second disadvantage is the lack of adaptivity of such defined macro to the conditions it is executed in. Exemplary lack of adaptivity is a macro that sequentially opens a large data set file, reads a portion of the data and stores in another file on a computer system. Such macro will always open the large file mentioned in the first step. The present invention describes a system that will allow for automatic and efficient processing of the file even if it is already open.

Keyboard macros and mouse macros allow short sequences of keystrokes and mouse actions to be transformed into other, usually more time-consuming, sequences of keystrokes and mouse actions. In this way, frequently used or repetitive sequences of keystrokes and mouse movements can be automated. Separate programs for creating these macros are called macro recorders.

Not all software comes with a built-in macro recorder. A standalone macro-recorder program allows a user to "record" mouse and keyboard functions for "playback" at a later time. This allows automating any activity in any software application: from copy-pasting spreadsheet data to operating system maintenance actions.

Macro recorders do not attempt to analyze or interpret what the user did when the macro was recorded. This can cause problems when trying to execute a macro if the user's desktop environment has changed. For example, if the user has changed their desktop resolution, moved icons, or moved the task bar, the mouse macro may not perform the way the user intended. That's one of the reasons for preferring keyboard macros over the mouse-oriented ones. (source: Wikipedia)

The aim of the development of the present invention is an improved system and method for automatic advancement of navigation through user interface.

SUMMARY AND OBJECTS OF THE PRESENT INVENTION

An object of the present invention is a method for automatic advancement of navigation through a user interface, the method comprising the steps of: (a) providing a graph being a representation of the user interface, comprising at least two states and at least one path allowing navigation from one of said states to a different one of said states; (b) clearing a current path; (c) receiving a request to navigate to a state of said states and outputting a suitable response; (d) adding the current state to the current path; (e) starting a timer; (f) receiving a request to navigate to another state of said states and outputting a suitable response; (g) stopping said timer and comparing its result with a threshold value wherein if said result is lower than said threshold, adding information on said another state to the current path; (h) storing the current path in a paths database; (i) repeating steps (e)-(h) until said result is greater than said threshold.

Preferably, prior to storing the current path there is executed a step of checking (310) whether the modified path is longer than a certain path length threshold.

Preferably, the method further comprises the steps of: navigating to a state of the at least two states; retrieving all paths for said state from the paths database; extracting all said paths' endings; presenting to a user direct links to states represented by said endings.

Preferably, each path has an importance level assigned reflecting the suitability of the path for presentation to the user.

Preferably, the current path comprises a sequence of sub-nodes each containing an unambiguous reference to one state of the graph.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing a system and method for automatic advancement of navigation through user interface. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The present invention defines a model of data that allows for best description of detection and execution of the most common actions as described in the following exemplary embodiment. As a result of the implementation of the present invention, its exemplary embodiment may be modified to include a short-cut to 'open document and count words as well as check spelling all in one action such as a mouse-click'.

Figure 1:
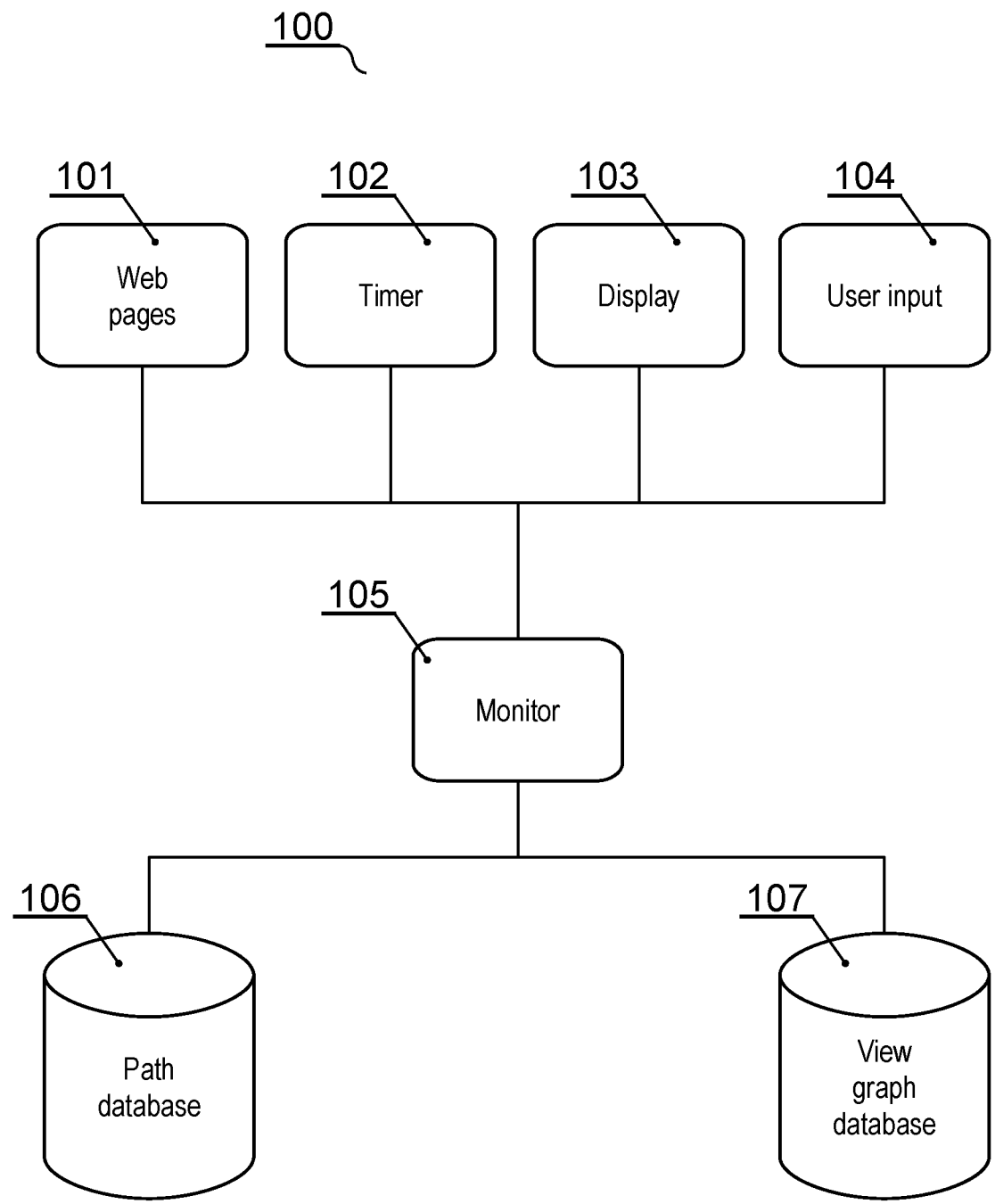
FIG. 1 presents a diagram of the system according to the present invention.

An exemplary embodiment of the present invention comprises a system shown in FIG. 1. The system comprises a web portal comprising a collection of web pages 101 managed by a monitor 105. Further the system 100 preferably comprises a display 103 able to show the content of the web pages from a collection 101 and user input 104 for processing of page change requests (both changes within a current page as well as changes between pages).

As will be evident to one skilled in the art, the web browsing by a user of a client device (be it a smartphone, a tablet, a personal computer or the like) is an exemplary GUI environment reacting to user input means (such as mouse events, keyboard events, gesture events or similar). In general such input may be affected by software (e.g. a different software) or hardware means.

In some embodiments, the client interface may be textual only without any GUI, in its common meaning of a windowed GUI having GUI objects such as check-boxes, dialog boxed, drop-down lists, buttons etc.

An example of the display 103 is a computer monitor, while an example of the user input is a mouse click.

The system 100 is further equipped or otherwise can use in any manner a time resource 102 providing a possibility to measure elapsed time. An exemplary embodiment of such time resource 102 can be a real time clock. It is in no way limiting to the present invention whether the time measured by the timer 102 is a real time representation or a number of epochs of any kind or a number of actions or changes of any kind or the like.

Figure 2:
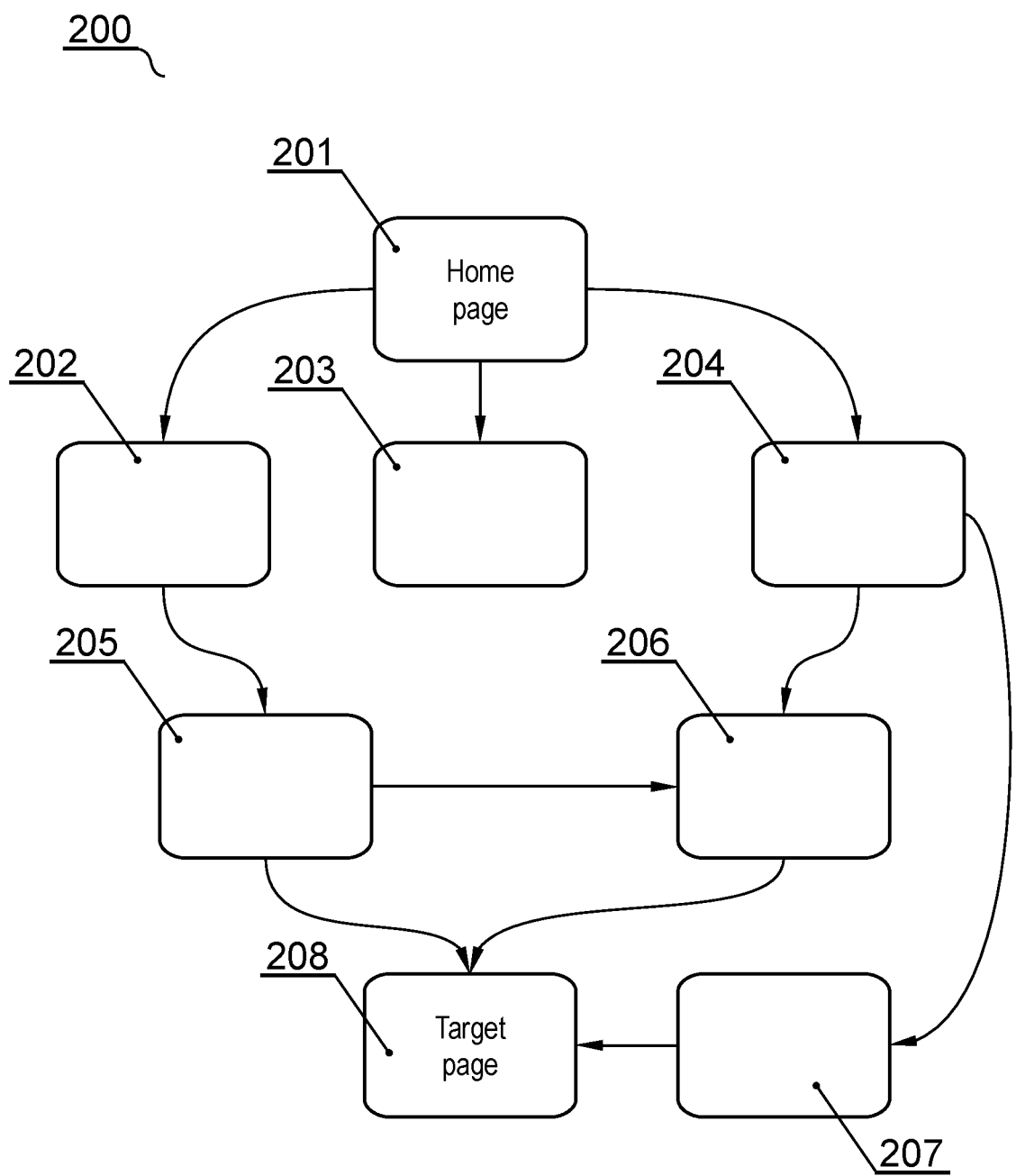
FIG. 2 shows an exemplary graph of views.

Additionally, the present embodiment of the present invention comprises a data model, configured to store the model of the web portal and its pages and capable of storing paths detected in that model, the data model comprising a graph 200 of elements 201 through 208 (also called GUI states) as presented in FIG. 2. This graph is stored in a paths database 106 accessible by the monitor 105.

The graph 200 is a representation of the GUI, its metadata, and as will be evident the graph 200 is not required to be available in its graphical form. The graph 200 is thus a representation of the user interface, comprising at least two states and at least one path allowing navigation from one of said states to a different one of said states.

The graph 200, further comprises connections between its elements. A single connection links exactly two elements and has a direction i.e. when traversing the graph in any way or for any purpose it is possible to traverse from one element to another if and only if there exists a connection between those elements and its direction is same as direction of the traverse.

A path in the graph 200, is a sequence of elements belonging to the graph 200, of which each and every two adjacent elements are linked by at least a connection of a direction from the former to the later element. It is possible that the elements (states of browsing) in the path are included more than once. However, it will become apparent to a one skilled in the art that such approach will not typically be useful for the present invention.

The monitor can further access a database 107 of paths (e.g. detected paths, path's statistics, and paths stored and made available to users). The monitor can realize methods according to the present invention (described in the following paragraphs) to advance the navigation between pages of the web page collection 101.

Moving to FIG. 2, an exemplary graph 200 of views is presented, which has been built for an exemplary collection 101 of pages. Each element 201 through 208 in the graph 200, represents one page that the user of the web portal may navigate to.

The connections in the graph, represent the possibilities of navigation from one page to another according to the direction of the connection. For example the connection between element 202 and 205 represents the possibility of navigation from page corresponding to element 202 to the respective page corresponding to element 205.

Additionally, the lack of a similar connection between elements 202 and 203 represents lack of such possibility. It is to be noted that the actual web portal may contain more elements or more navigation possibilities may exist e.g. there may always exist a possibility to return to home page 201 from any other page. However, the usage of the present embodiment of the present invention allows (and typically it will be practical to do so) to include only a subset of the elements of the system in the presently described data model 200.

The simplicity of the present embodiment's model 200 is intentional and serves a better clarity of the present description.

Additionally, the connections represented in FIG. 2 may in fact represent a possibility to navigate from one element in the graph to another via additional pages not included in the graph which is not limiting to the present invention in any way.

Moreover, it is apparent to a one skilled in the art that if the aforementioned additional pages are added to the graph, such situation becomes equivalent to the present embodiment of the present invention.

It is apparent to a one skilled in the art that the pages, of the collection 101, may change states and therefore the navigation among those pages may be dependent on that state.

A skilled person will also appreciate that this can be incorporated as a part of the present invention in two ways depending on a specific use. Firstly, each state may be included as a separate page in the data model. An example of such state would be the filtering applied to a large table that reduces the number of displayed elements. Secondly, the existence of a connection between elements and therefore the possibility of navigation between the corresponding pages may be dependent on the state of a particular page or the collection as a whole.

Therefore, a skilled person will recognize that each method of the present invention may be easily adapted to operating always on the present state of the databases 106 and 107 and to include the conditional nature of the connections and thus will always resolve such dependency correctly and record or present to the user only the correct paths or possibilities or connections or links or the like.

An example of such conditional nature is a personal history of orders in an Internet store. A connection from a home page to such history page will become available only after valid user credentials are read by the server.

Figure 3:
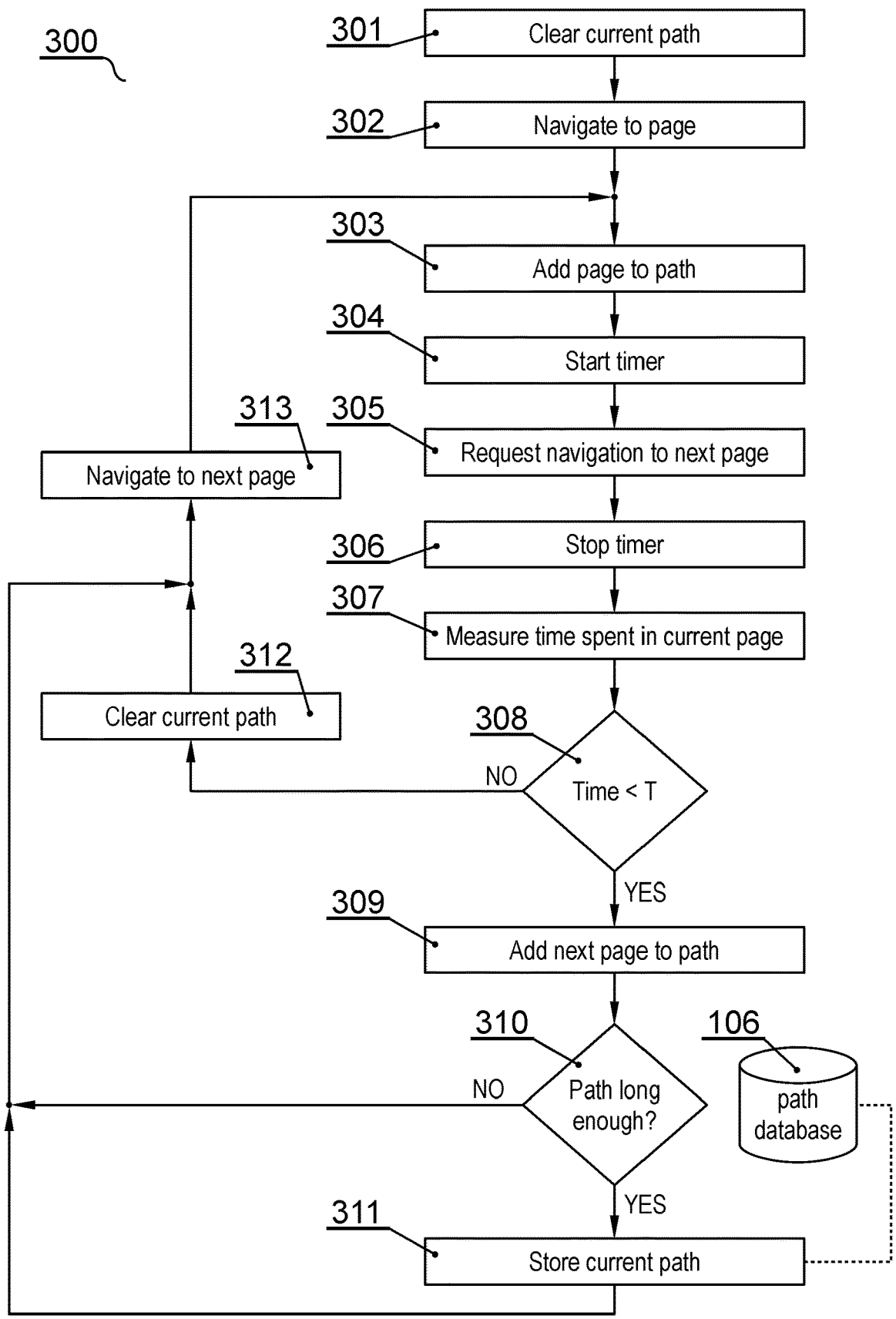
FIG. 3 presents a diagram of the method according to the present invention.

An exemplary method according to the present embodiment of the present invention comprises creation of paths in the aforementioned graph. The method 300 is realized according to FIG. 3 wherein prior to execution of the method 300 a graph 200 for a given software must be accessible to the device (be it access from local of remote storage).

The method begins with clearing the current path at step 301. The current path comprises a sequence of pages (GUI states) traversed by the user. Next, the user navigates to the first page visited by the user at step 302 (i.e. a corresponding system receives a request to navigate and outputs a suitable response). At step 303 the current page is added to the path which at this point makes it first and only page on the path.

Subsequently, the method starts a timer at step 304. The purpose of the timer is to measure the time span between the entry to a page and navigation to the next page. Eventually, at step 305 the user requests navigation to the next page. The timer is stopped at step 306 and at step 307 it is measured how much time elapsed between navigation to the page and navigation to the next page.

The timer allows to distinguish between automatic and common events with respect to events that require thoughtful preparation. For example, after logging in to an operating system, a user usually starts their e-mail client, browser and navigates to a given web-page on which the user logs in. Typically, such user will execute these steps quickly as a routine.

In step 308, the time value is compared to a threshold value and if smaller, then the method moves to step 309 and adds the next page to the current path. Next, the method checks whether the modified path is longer than a certain path length threshold at step 310 to avoid too short paths being stored and if so stores the updated path in step 311 in the paths database 106.

Next, the method navigates to the next page at step 313 and repeats the steps starting back from 303. The same navigation in step 313 happens if the path is not long enough at step 310 (such behaviour avoids storing of many short paths). If at step 308 the method determined the time spent was larger than a threshold, the method determines the end of currently analysed path and clears the current path at step 312 and moves to step 313 to navigate to the next page.

It is to be noted that nothing is stored in the paths database 106 upon clearing of the path in step 312. Such operation will become apparent after analysing the method of storing and using the paths presented hereinafter and depicted in FIG. 4 and FIG. 5.

It is in no way limiting to the present invention how the threshold value is computed for use in step 308. An exemplary embodiment of such threshold is a fixed value. Another exemplary embodied of such threshold value is a dedicated value established per a connection in graph (either manually, arbitrarily or automatically or the like).

An exemplary embodiment of a stored path is an XML node in an XML file comprising a sequence of sub-nodes each containing an unambiguous reference to one page (state of the graph 200). An exemplary embodiment of an unambiguous reference may be a URL of a web page. An exemplary path comprising 4 nodes is:

```
<path>
    <node>unambiguous URL of page 201</node>
    <node>unambiguous URL of page 202</node>
    <node>unambiguous URL of page 205</node>
    <node>unambiguous URL of page 207</node>
</path>
```

Nevertheless, a URL may sometimes be an insufficient identifier to distinguish pages i.e. may be ambiguous. In such case other means of identifying pages can be devised. One example of such identification is assignment of a UUID (Universally Unique Identifier) to each page and using that UUID as an unambiguous identifier.

Figure 4:
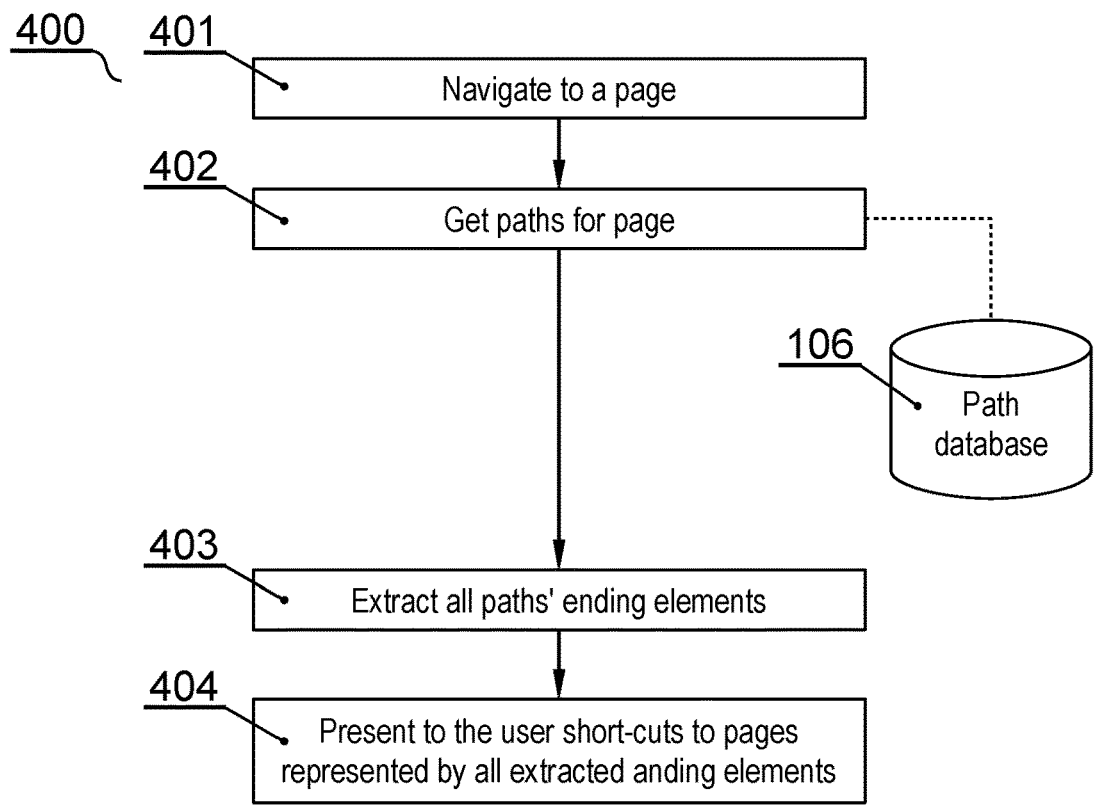
FIG. 4 depicts a method of using the stored paths.

FIG. 4 presents a method 400 of using the stored paths. The method begins with navigation to a page at step 401. Next at step 402 all paths for this page are retrieved from paths database 106.

It is to be noted that the term 'paths for page' may be defined variously which is in no way limiting to the present invention. One exemplary embodiment of 'paths for page' may be paths that begin with the element representing the page (hereinafter referred to as 'paths for page' embodiment 1). Another exemplary embodiment of 'paths for page' may be all paths that include the element representing the page that are no closer to the ending of the path than 2 steps (hereinafter referred to as 'paths for page' embodiment 2).

It is apparent to a one skilled in the art that smaller distance typically means a direct navigation to the next page which is pointless in the present embodiment of the present invention. Yet another exemplary embodiment of 'paths for page' is all paths that begin at the element representing the page but have importance level greater than a certain threshold (hereinafter referred to as 'paths for page' embodiment 3). The storing of the importance level is presented by method 500 of FIG. 5. Next at step 403 the method extracts all paths' endings and at step 404 presents to the user direct links or short-cuts or the like to the pages represented by the endings extracted at step 403.

An exemplary path may begin at a home page of an Internet forum. Next, the path includes: discussion room, category of topics, subcategory of topics and a specific topic. If a considered page is a discussion room, the presented path will be included in 'paths for page' embodiment 2. However, it will not be included in 'paths for page' embodiment 1.

Figure 5:
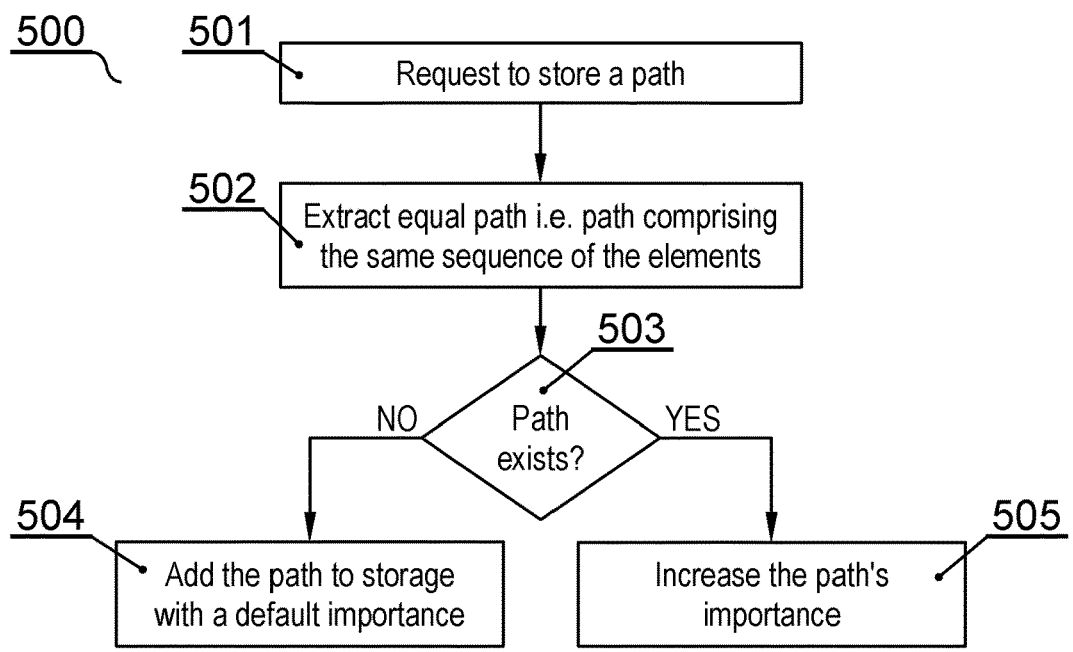
FIG. 5 shows storing of paths.

Storing of paths is presented in FIG. 5. The method 500 begins at step 501 with a request to store a path. Next, at step 502, it is checked whether the paths database 106 already comprises the exact path i.e. a path that consists of the same sequence of the same elements. The existence of that path is checked at step 503 and if the path does exist, its importance level is increased at step 505. If the path does not exist at step 503, it is added to the paths database 106 at step 504 with a default importance level.

An exemplary embodiment of the importance level is the number of times the path is traversed. Another exemplary embodiment of the importance level is the collective time spent traversing that path. Other embodiments may be designed comprising other factors or combinations of factors so as to reflect the suitability if the path for presentation to the user. This is in no way limiting to the present invention but rather, as a skilled person will recognize, it widens the usability range of the present invention.

The present invention allows to advance the traversing through user interface based on paths most frequently undertaken by the user thus skipping mostly unused parts of the interface. This in turn saves time. Therefore, the invention provides a useful, concrete and tangible result.

The invention provides also monitoring of use of a computer system and processing of activity data in order to create automated paths easing access to common function and speeding up common tasks. Therefore, the machine or transformation test is fulfilled and the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for automatic advancement of navigation through user interface may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for automatic advancement of navigation through a user interface, the method comprising:
   (a) providing a graph being a representation of the user interface, comprising at least two states and at least one path allowing navigation from one of said at least two states to a different one of said at least two states;
   (b) clearing a current path comprising a sequence of states;
   (c) receiving a request to navigate to a state of said at least two states and outputting a response corresponding to said state;
   (d) adding a current state to the current path;
   (e) starting a timer;
   (f) receiving a request to navigate to another state of said at least two states and outputting a response corresponding to said another state;
   (g) stopping said timer and comparing a value of said timer with a threshold value, wherein in response to said value of said timer being lower than said threshold value, adding information regarding said another state to the current path;
   (h) storing the current path in a paths database; and
   (i) repeating (e)-(h) until said value of said timer is greater than said threshold value.

2. The method according to claim 1, wherein prior to storing the current path in the paths database, executing a step of checking whether a modified path is longer than a certain path length threshold.

3. The method according to claim 1, further comprising:
   navigating to a state of the at least two states;
   retrieving all paths, for said navigated to state, from the paths database;
   extracting endings of said all paths;
   presenting to a user direct links to states represented by said endings.

4. The method according to claim 1, wherein each path has an importance level assigned based on a number of times the path has been traversed.

5. The method according to claim 1, wherein the current path comprises a sequence of sub-nodes each containing a reference to only one state of the graph.

6. A non-transitory computer readable medium storing computer-executable instructions that when executed on a computer, perform steps for automatic advancement of navigation through a user interface, the steps comprising:
- (a) providing a graph being a representation of the user interface, comprising at least two states and at least one path allowing navigation from one of said at least two states to a different one of said at least two states;
- (b) clearing a current path comprising a sequence of states;
- (c) receiving a request to navigate to a state of said at least two states and outputting a response corresponding to said state;
- (d) adding a current state to the current path;
- (e) starting a timer;
- (f) receiving a request to navigate to another state of said at least two states and outputting a response corresponding to said another state;
- (g) stopping said timer and comparing a value of said timer with a threshold value, wherein in response to said value of said timer being lower than said threshold value, adding information regarding said another state to the current path;
- (h) storing the current path in a paths database; and
- (i) repeating steps (e)-(h) until said value of said timer is greater than said threshold value.

* * * * *